United States Patent [19]

Miller

[11] Patent Number: 4,500,824
[45] Date of Patent: Feb. 19, 1985

[54] METHOD OF COMMUTATION AND CONVERTER CIRCUIT FOR SWITCHED RELUCTANCE MOTORS

[75] Inventor: Timothy J. E. Miller, Schenectady, N.Y.

[73] Assignee: General Electric Company, Schenectady, N.Y.

[21] Appl. No.: 612,517

[22] Filed: May 21, 1984

[51] Int. Cl.³ .............................................. H02K 29/02
[52] U.S. Cl. ..................................... 318/701; 318/138; 318/139; 318/254; 318/696
[58] Field of Search ............... 318/701, 720, 721, 722, 318/800, 801, 804, 138, 254 A, 254, 439, 139, 696

[56] References Cited

U.S. PATENT DOCUMENTS

| | | | |
|---|---|---|---|
| 3,560,817 | 2/1971 | Amato | 318/139 X |
| 3,678,352 | 7/1982 | Bedford | 318/138 |
| 3,679,953 | 7/1972 | Bedford | 318/138 |
| 3,890,554 | 6/1975 | Yoshitake et al. | 318/696 |
| 3,919,608 | 11/1975 | Usami et al. | 318/696 X |
| 4,270,075 | 5/1981 | Nygaard | 318/138 X |
| 4,286,198 | 8/1981 | de Valroger | 318/254 X |
| 4,484,124 | 11/1984 | White el al | 318/696 |

FOREIGN PATENT DOCUMENTS

| | | | |
|---|---|---|---|
| 55-109196 | 8/1980 | Japan | 318/696 |
| 57-65298 | 4/1982 | Japan | 318/696 |
| 57-78398 | 5/1982 | Japan | 318/696 |

OTHER PUBLICATIONS

R. M. Davis, W. F. Ray, and R. J. Blake, *Inverter Drive For Switched Reluctance Motor*: Circuits and Component Ratings, IEEE Proc., Mar. 1981.

*Primary Examiner*—William M. Shoop
*Assistant Examiner*—Bentsu Ro
*Attorney, Agent, or Firm*—Mark L. Mollon; James C. Davis, Jr.; Marvin Snyder

[57] ABSTRACT

Plural stage commutation for a switched reluctance drive is performed by a converter circuit which short-circuits half of a bifilar phase winding, or an entire phase winding, for a controlled period in the second commutation stage so as to increase output power of the drive without increasing peak current in the switching device of the converter.

10 Claims, 14 Drawing Figures

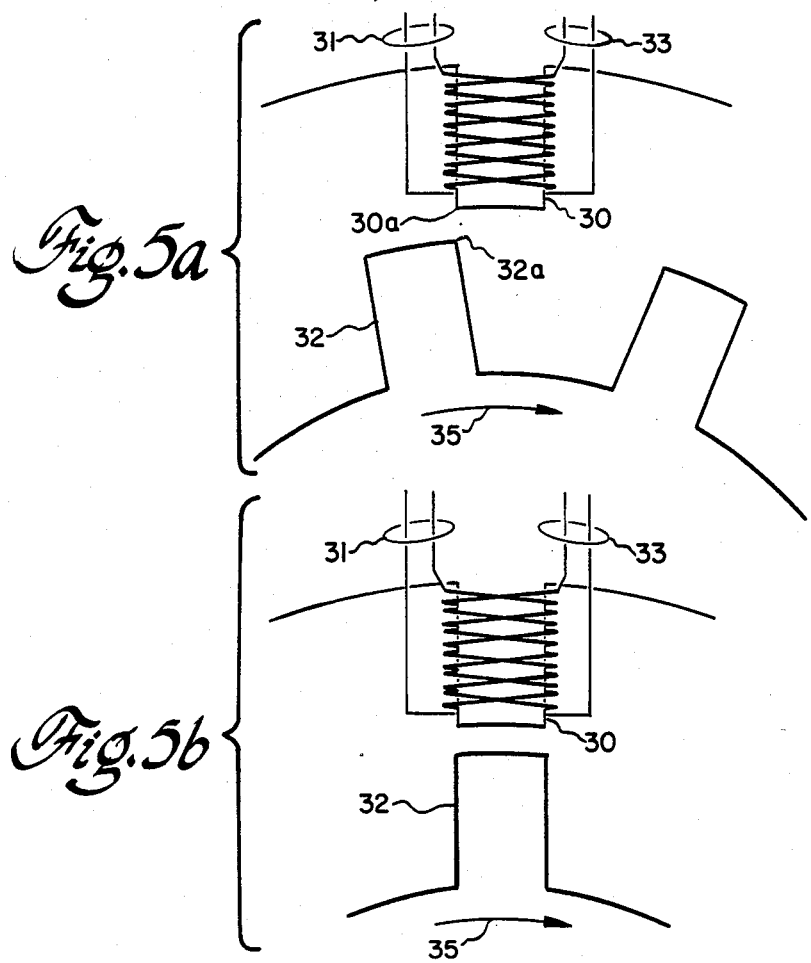
*Fig.5a*
*Fig.5b*
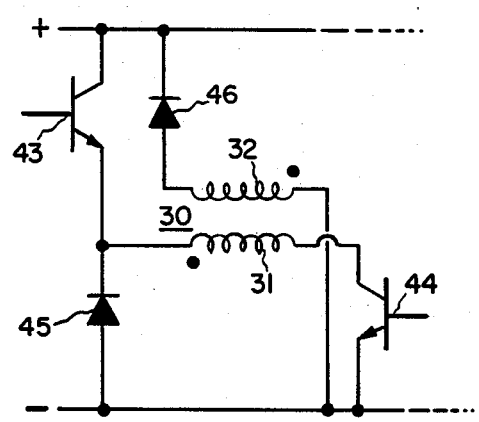
*Fig.6*
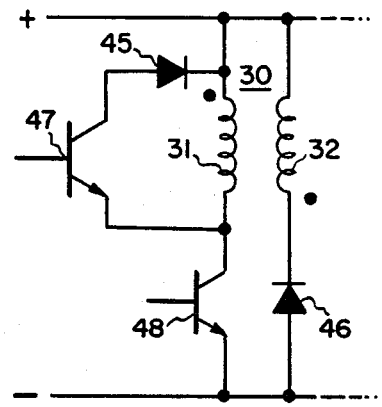
*Fig.7*

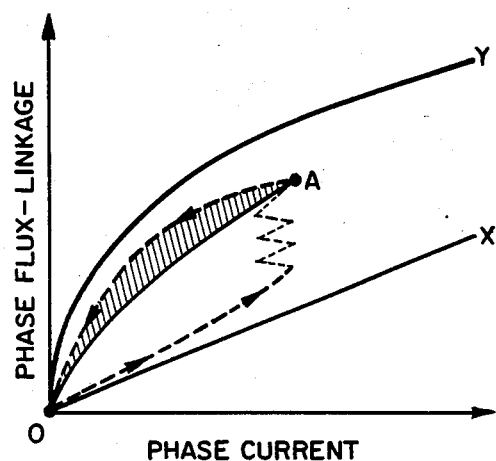
Fig. 8a
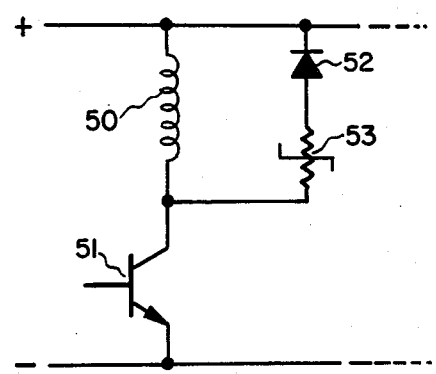
Fig. 8b
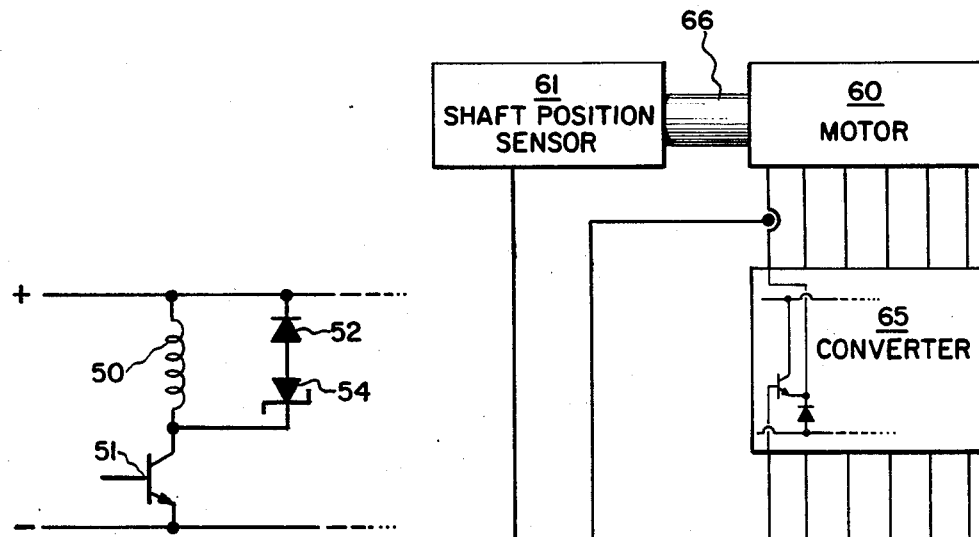
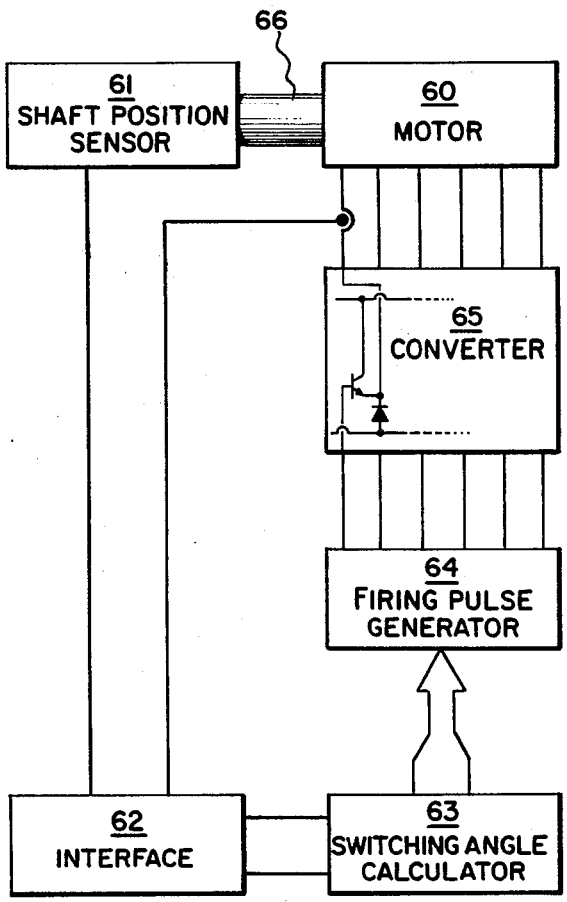
Fig. 9
Fig. 10

METHOD OF COMMUTATION AND CONVERTER CIRCUIT FOR SWITCHED RELUCTANCE MOTORS

BACKGROUND OF THE INVENTION

This invention relates to an electronic converter drive for a switched reluctance motor.

Switched reluctance motors conventionally have poles or teeth on both the stator and rotor (i.e. doubly salient). There are phase windings on the stator but no windings on the rotor. Each pair of diametrically opposite stator poles is connected in series to form one phase of the switched reluctance motor.

Torque is produced by switching current on in each phase winding in a predetermined sequence that is synchronized with the angular position of the rotor, so that a magnetic force of attraction results between the rotor and stator poles that are approaching each other. The current is switched off in each phase before the rotor poles nearest the stator poles of that phase rotate past the aligned position, otherwise the magnetic force of attraction will produce a negative or braking torque.

The torque developed is independent of the direction of current flow so that unidirectional current pulses synchronized with rotor movement can be obtained from an converter using a unidirectional current switching element such as a thyristor or transistor.

Each time a phase of the switched reluctance motor is switched on by closing a switch in a converter, current flows in the stator winding, providing energy from a dc supply to the motor. The energy drawn from the supply is converted partly into mechanical energy by causing the rotor to rotate towards a minimum reluctance configuration and partly into stored energy associated with the magnetic field. After the switch is opened, part of the stored magnetic energy is converted to mechanical output and part of the energy is returned to the dc source.

Net energy delivered by the dc supply (total energy supplied to the machine less the energy returned to the dc supply) in one cycle may be illustrated graphically and is equal to the area enclosed by the trajectory of flux-linkage versus current. This net energy is closely related to the mechanical output energy of the motor. It is desirable to maximize the enclosed area of the trajectory and therefore maximize mechanical output energy for a given peak current, not only to maximize utilization of the peak current capability of the converter switching device but also increase efficiency since high peak current causes saturation and increased iron losses.

In the simple commutation process of switching on one phase of the converter and building up flux and then switching off the phase and having flux decay there is very little control over the shape of the flux-linkage/-current trajectory. The only control variables are the times when the converter switching device is switched on and off, and the magnitude of the dc supply voltage. Once these parameters have been chosen, the flux-linkage/current trajectory for any given motor speed will be fixed, and in general will have an area much smaller than the ideal theoretical maximum.

One approach which has been proposed in the past to limit the peak current is to limit the dc supply voltage by switching the converter transistor off when the current reaches a preset level and switching it on again when the current falls below a somewhat lower level. This can be done with no additional switching elements and only requires the addition of a current-sensing transducer and logic control circuitry. This strategy has been used not so much for increasing the area of the flux-linkage/current trajectory, as for limiting the peak current at low speeds, when there is insufficient back-emf from the motor to accomplish this limitation. The effect of "chopping" on the flux-linkage/current trajectory is to improve its shape because it occupies a larger fraction of the theoretically available area. However, beyond the maximum current at maximum flux linkage, the trajectory is not under the control of the chopping controller and is no better than that of the simple commutation process.

OBJECTS OF THE INVENTION

It is a principal object of the present invention to provide a new and improved method for commutating a switched reluctance drive which is not subject to the foregoing disadvantages.

It is a further object of the present invention to provide a method for improving the mechanical output energy of a switched reluctance drive for a given peak current in the converter switching devices.

It is another object of the present invention to provide a method to improve the efficiency of a switched reluctance drive.

It is a further object of the present invention to provide a commutation process for a switched reluctance drive whereby the area of the flux-linkage/current trajectory for any phase is increased in order to increase torque for a given peak current.

It is another object of the present invention to provide a new and improved converter circuit for commutating a switched reluctance drive with increased area of the flux-linkage/current trajectory for any phase so as to increase torque for a given peak current.

SUMMARY OF THE INVENTION

These and other objects are achieved by the disclosed commutation method and converter circuits therefor, wherein the flux-linkage/current trajectory of each phase is modified to improve the mechanical output energy and drive efficiency for a given peak phase current.

In a preferred embodiment, modification of the flux-linkage/current trajectory is carried out by a three stage commutation process. In the first stage, beginning with the rotor poles in a predetermined angular position with respect to the stator phase, current is supplied to the phase winding causing the rotor poles to rotate toward the stator poles. In the second stage, beginning when the rotor poles and stator poles are first 10°–20° prior to being aligned or partially overlapped and ending when they are 5°–10° prior to being aligned, the phase winding is short-circuited. In the third stage, current in the phase winding is returned to the dc source by freewheeling, i.e. disconnecting the winding from the source, and then placing the winding across the source with reversed polarity. The current decreases substantially to zero by the time that the stator and rotor poles are aligned. In an alternative embodiment, the short-circuit of the second stage and the freewheeling of the third stage are approximated by a single stage using a device which provides a substantially constant voltage across the phase winding.

The features and advantages of the present invention will become apparent from the following detailed description of the invention when read with the accompanying drawings in which applicable reference numerals have been retained.

BRIEF DESCRIPTION OF THE DRAWINGS

FIGS. 5(a) and 5(b) show two different relative positions of the stator pole and the rotor pole.

FIG. 6 shows a converter circuit for a phase having a bifilar winding which may be used in the commutation method of FIG. 4.

FIG. 7 shows an embodiment of a converter circuit somewhat similar to the embodiment of FIG. 6.

FIG. 8(a) shows a modified flux-linkage/current trajectory of the two stage commutation method of the present invention.

FIG. 8(b) shows a converter circuit which may be used in the commutation method graphically illustrated by FIG. 8(a).

FIG. 9 is a converter circuit embodiment somewhat similar to the embodiment of FIG. 8(b).

FIG. 10 is a block diagram of a drive system used to control the converter circuits of the present invention.

DETAILED DESCRIPTION OF THE INVENTION

Figure 1:
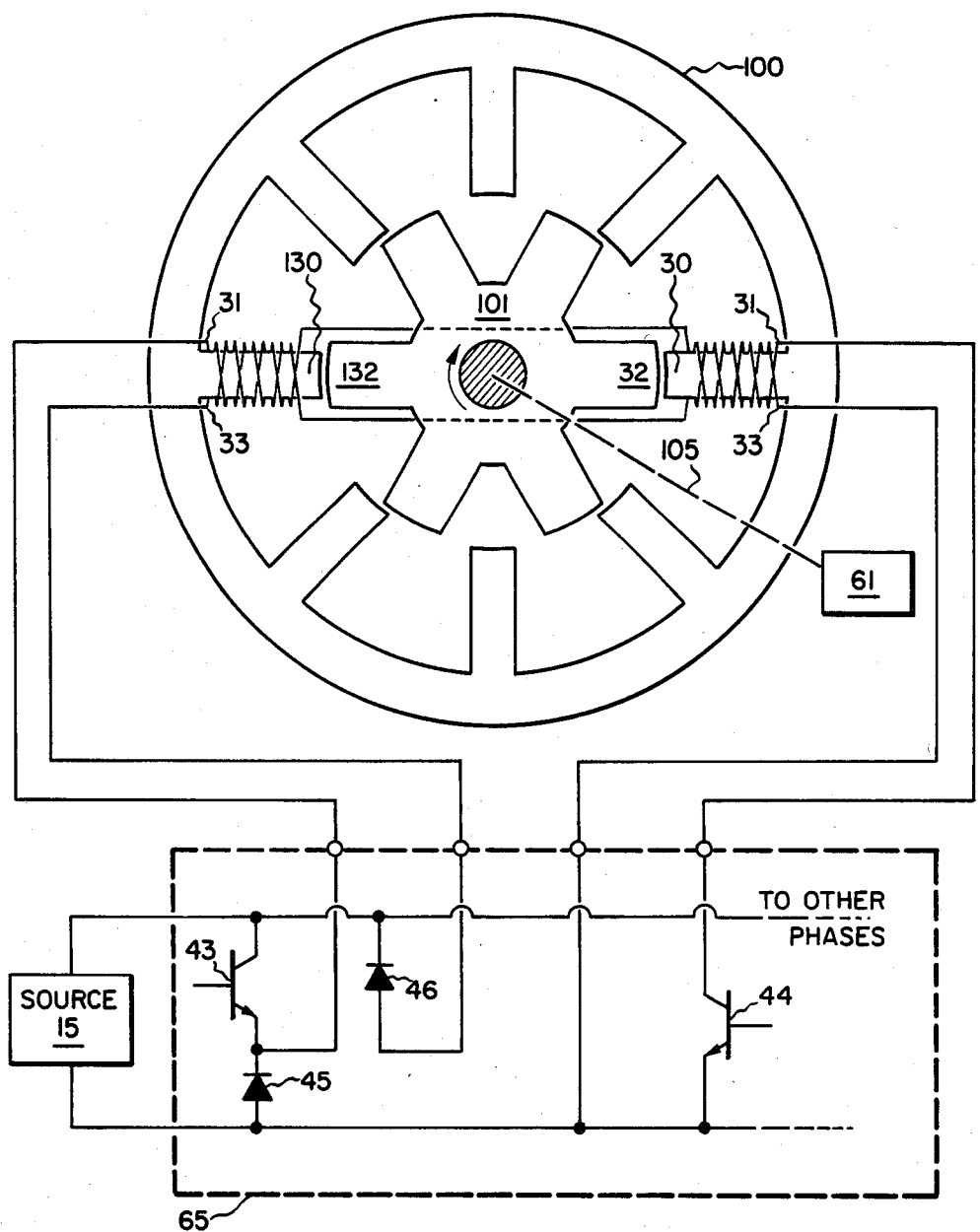
FIG. 1 illustrates a cross-sectional view of a switched reluctance motor and a portion of an converter circuit in accordance with the present invention.

FIG. 1 shows a portion of a switched reluctance motor and a converter circuit of the invention for one phase which is also shown in FIG. 6. A laminated iron stator 100 has a plurality of stator pole pairs, including a pair comprised of stator poles 30 and 130. A primary coil 31 and a secondary coil 33 are each wound in series on stator poles 30 and 130. The coils are energized by an converter 65 as will be described below.

A laminated iron rotor 101 has a plurality of pairs of rotor poles including a pair comprised of rotor poles 32 and 132. Rotor 101 is fastened to a shaft 105 and a shaft position sensor 61.

Although the following discussion references only one motor phase, it will be clear that all phases behave identically except that their energization by the converter may be phased by equal increments of rotor rotation.

Figure 2A:
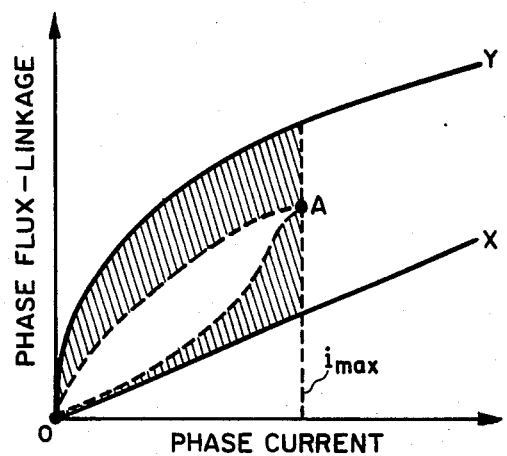
FIG. 2(a) shows a flux-linkage/current trajectory of a prior art commutation method.
Figure 2B:
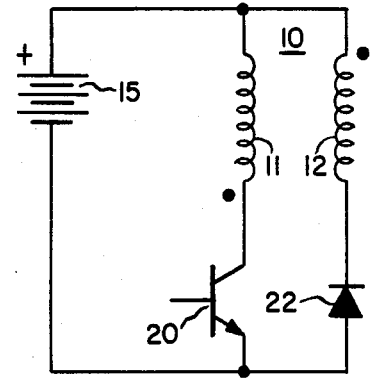
FIG. 2(b) shows an exemplary prior art converter circuit which may be used in the commutation method of FIG. 2(a).

The converter circuit of FIG. 2(b) comprises a bifilar winding 10 having a primary coil 11 and a secondary coil 12, wherein an increasing with time positive current entering a dotted terminal of one coil produces an open-circuit voltage across the second coil which is positive at the dotted terminal of the other coil. Secondary coil 12 is connected in series with a diode 22 and a dc source 15, the dc source and the diode being connected in series opposition. The collector of a bipolar transistor 20 is connected to the dotted terminal of coil 11 and the emiter of transistor 20 is connected to the anode of diode 22, while the non-dotted terminal of coil 11 is connected to the dc source 15 and the dotted terminal of coil 12. The base of transistor 20 is connected to a control circuit, not shown.

The flux-linkage/current trajectory for one phase of a prior art motor according to the converter circuit illustrated in FIG. 2(b) is shown in FIG. 2(a). Curves OX and OY represent the magnetization characteristics of one phase when the rotor is stationary in the minimum and maximum inductance positions, respectively. Dashed curve OA is the trajectory in a running motor resulting from the flow of current in primary coil 11 of bifilar winding 10 when switching element 20 is conducting, and unidirectional conduction device 22 prevents current from flowing in secondary coil 12. At commutation point A, maximum current is flowing into primary 11 from dc source 15. This maximum current must be within the maximum current carrying capability of transistor 20. At point A, transistor 20 is switched off through circuitry (not shown) connected to the base electrode, in a manner well-known in the art and described below with reference to FIG. 9, interrupting current flow in primary 11. The resulting voltage induced in secondary 12 produces a current flow and, since secondary 12 is wound in the opposite direction of primary 11, as shown by the dots, the current flowing from secondary 12 is returned to dc source 15 through forward-connected diode 22. As current and flux-linkage decrease, the trajectory returns to commutation point O.

The area within trajectory OAO in FIG. 2(a) is related to the mechanical output energy of the motor, as previously described. The shaded area represents unrealized torque producing capability for a given maximum phase current.

Figure 3:
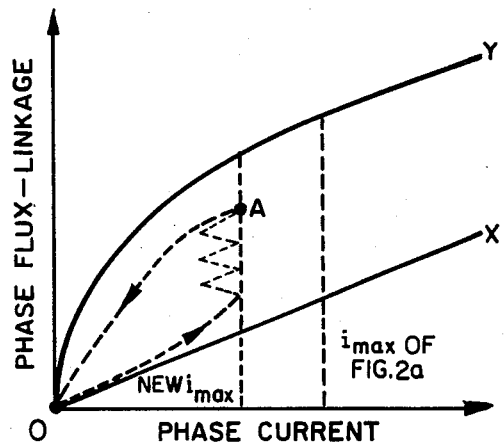
FIG. 3 shows the flux-linkage/current trajectory of a prior art chopping circuit.

The circuit of FIG. 2(b) may be controlled to provide peak current limiting at low speeds resulting in a new, lower maximum current as shown in FIG. 3. The zig-zag trajectory results from chopping of the dc voltage by switching transistor 20 on and off according to phase current.

Figure 4:
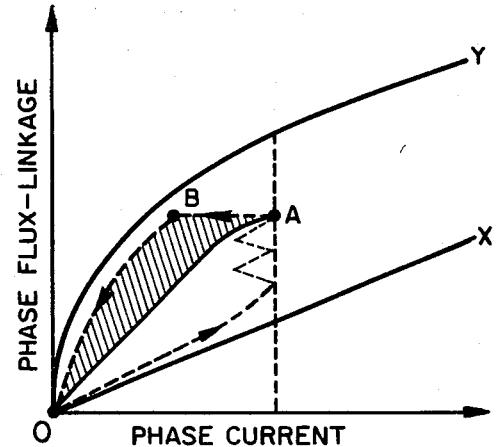
FIG. 4 shows the improved flux-linkage/current trajectory of the three stage commutation method of the present invention.

Referring now to FIG. 4, an improved trajectory resulting from the three stage commutation method of the present invention is seen. At commutation point A the phase winding is short-circuited and, since the phase winding has only a very small resistance, flux-linkage remains nearly constant, resulting in line AB. At commutation point B the short-circuit is removed and the current commutates in the normal way. The shaded area in the drawing shows the increased realization of torque-producing capability achieved by the present invention.

The relative positions of stator pole 30 and rotor pole 32 at the commutation points described above will be described with reference to FIGS. 5(a) and 5(b). Bifilar-wound stator pole 30 is one of a pair of diametrically-opposite stator poles wound in series and comprising one phase. Rotor pole 32 is diametrically opposite another rotor pole (not shown) which has the same relative position to the other stator pole (not shown) of the pair as does rotor pole 32 to stator pole 30. Rotor pole 32 moves in the direction shown by arrow 35.

When current begins to flow in primary coil 31, for example, at point O in FIG. 4, rotor pole 32 is a predetermined distance to the left of its position shown in FIG. 5(a). The predetermined distance is a function of motor speed and torque, and it allows phase current to increase to commutation point A in FIG. 4 by the time that rotor pole 32 reaches a position such as that shown in FIG. 5(a), or a few degrees later.

Short-circuiting of primary coil 31 begins when rotor pole 32 reaches the position shown in FIG. 5(a), i.e. when rotor pole 32 and stator pole 30 are first partially overlapped. This will typically occur 10°-20° prior to alignment. At this point the phase current is just sufficient to saturate the adjacent pole corners 30a and 32a. The short-circuit continues until rotor pole 32 is a predetermined distance to the left of the position shown in FIG. 5(b), preferably about 5° to 10° of rotor rotation prior to the aligned position shown. This predetermined distance allows sufficient time for the third stage of the commutation method to decrease the phase current to zero by the time that rotor pole 32 and stator pole 30 are aligned, as shown in FIG. 5(b). As previously described, the third stage of commutation may comprise freewheeling with the removal of current through secondary coil 33.

One embodiment of an converter circuit for performing the above described three stage commutation method illustrated graphically in FIG. 4 is shown in FIG. 6. The circuit comprises a transistor 43 having its collector connected to the positive terminal of a dc source (not shown) and its emitter connected to the dotted terminal of primary coil 31 of bifilar winding 30 and to a diode 45, which in series opposition to the dc source. The non-dotted terminal of primary 31 is connected to the collector of a transistor 44. The emitter of transistor 44 is connected to the negative terminal of the dc source, as is the dotted terminal of secondary coil 32. Seondary coil 32 is connected in series with a diode 46 and the dc source, the dc source and diode 46 being connected in series opposition.

The initial conduction period OA, shown in FIG. 4, is obtained in primary coil 31 with transistors 43 and 44 conducting. At commutation point A, transistor 43 is switched off and primary 31 is short-circuited through diode 45 and transistor 44. At commutation point B, transistor 44 is switched off and the current commutates into secondary coil 32. Since secondary 32 is wound in the direction opposite primary 31, the current flows through secondary 32 and diode 46 into the dc source, not shown. The control of transistors 43 and 44 will be described below with reference to FIG. 10.

Another embodiment of converter circuit for performing the above described three stage commutation method is shown in FIG. 7 and also uses bifilar winding 30. In this circuit, conduction period OA of FIG. 4 is obtained with transistor 48 conducting and transistor 47 nonconducting. At commutation point A, transistor 48 is turned off and transistor 47 switches into conduction short-circuiting primary coil 31. At commutation point B, transistor 47 is turned off and the current commutates into secondary coil 32 and flows into the dc source in the same way as in the previously described circuit. Diode 45 prevents transistor 47 from being reverse-biased.

A modified two stage commutation method is illustrated in FIG. 8(a), and is achieved with the circuit of FIG. 8(b). As shown in the drawing, a single coil phase winding 50 is connected to the positive dc terminal and to the collector of a transistor 51. The emitter of transistor 51 is connected to the negative dc terminal. A nonlinear resistor 53, whose value varies inversely with the current therein, is connected in series with a diode 52 across winding 50, diode 52 being connected in opposition to the dc source.

The trajectory of FIG. 8(a) is identical to that of the method illustrated in FIG. 4, until commutation point A is reached. At point A, transistor 51 is switched off and a nonlinear device, such as nonlinear resistor 53 removes current from winding 50. Initially, a large current flows through nonlinear resistor 53, approximating a short-circuit of winding 50. As the current decreases, the resistance of nonlinear resistor 53 increases, so that a substantially constant voltage is maintained across nonlinear resistor 53. As a result, the phase flux-linkage decays at a substantially linear rate with time. Thus, the trajectory in FIG. 8(a) shows an increased realization of torque-producing capability represented by the shaded area, though the increase is less than with the three stage commutation method. Furthermore, energy is dissipated in nonlinear resistor 53 rather than being returned to the dc source. The two-stage process is useful where efficiency is not the highest priority and where low cost and control simplicity are required.

FIG. 9 shows another circuit which may be used in the two stage commutation process. In this converter circuit, a zener diode 54 replaces nonlinear resistor 53 to provide a constant voltage drop thereacross.

Control of the converter circuits of the present invention will be described with reference to FIG. 10. Only the control of a three stage converter will be described because such controls are known in the art and it would be within the ordinary skill in the art to construct a control for a two stage converter since one less commutation point is required.

FIG. 10 is a block diagram of apparatus which senses rotor position, calculates switching angles and generates phase firing signals. The switching angles are calculated at which (1) the main switching device or devices turn on to energized a phase winding; (2) the winding is short-circuited; and (3) the short-circuit is opened allowing the motor current to freewheel.

The shaft position sensor 61 may be a device mechanically coupled to motor 60 that provides a fixed number of electrical pulses with each rotor revolution. The position of the rotor is determined by counting the pulses. An index pulse may be provided so that the absolute position can be ascertained.

Interface circuit 62 is a buffer amplifier which conditions and "squares up" (i.e., reshapes into rectangular form) the pulses from position sensor 61. Typically, circuit 62 may be a Schmitt trigger circuit.

Figure 11:
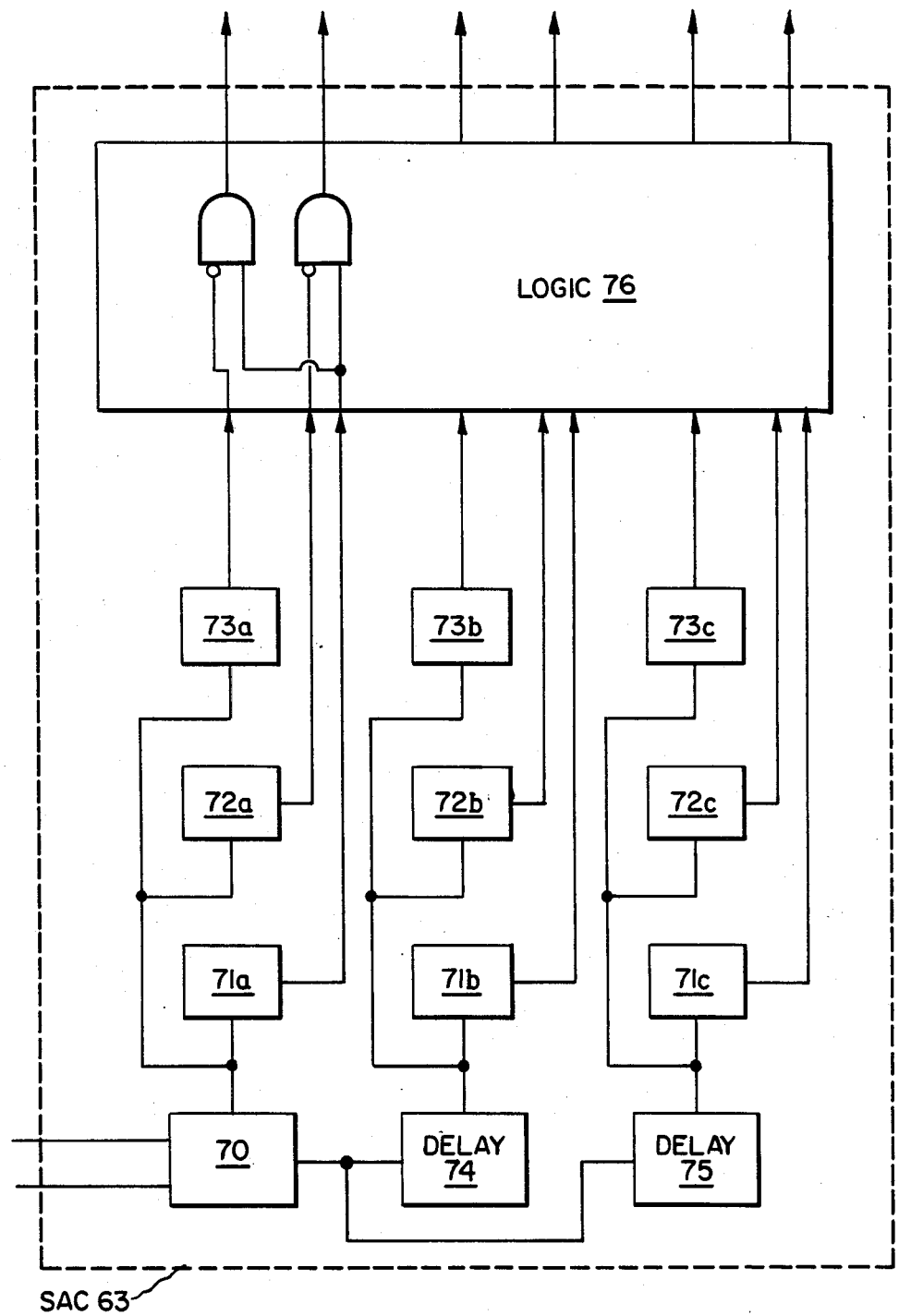
FIG. 11 shows the switching angle calculator of FIG. 10 in greater detail.

Switching Angle Calculator (SAC) 63, shown in detail in FIG. 11, is comprised of counters that divide down the sensor pulses received from interface 62. For example, if position sensor 61 produces 2400 pulses per revolution and the rotor has 6 poles, then a first counter 70 in SAC 63 divides by 400 to obtain 6 rotor position pulses per revolution. Each of these 6 pulses represents a reference pulse associated with a respective rotor pole and is used in resetting a respective one of a plurality of second counters 71a, 71b and 71c each associated with a separate phase, respectively. Each second counter counts down an interval corresponding to the angle through which the rotor is required to move before the respective phase current is switched on. This angle is predetermined as described previously and is stored in a memory (not shown), typically a microprocessor based memory. The reset signals for the respective phases coming from the rotor position pulses are delayed by appropriate amounts in delays 74 and 75 corresponding to the angular displacements between the phases.

Each respective one of a plurality of third counters 72a–72c, each associated with a separate phase, respectively, is reset by the pulses resetting second counters 71a, 71b and 71c, respectively. The third counters count down the intervals corresponding to the angle at which each phase winding is short-circuited. A plurality of fourth counters 73a–73c similarly count down the intervals unitl the short-circuit is removed. Logic circuit 76 may comprise AND gates as shown and uses pulses from counters 71–73 to control a firing pulse generator 64. The process is repeated in each phase at the next occurrence of a rotor position pulse which resets the counters.

In a microprocessor based control scheme the counts that are loaded into the various counters can be stored in memories or registers and their values can be changed at frequent intervals. The microprocessor may be programmed with a strategy that takes into account speed, load and command signals.

Firing pulse generator 64 is a standard type of circuit available as a single field-effect transistor in each phase, which amplifies the logic level signals received from SAC 63 to provide sufficient power to the converter switching devices to turn them on and off, for driving motor 60. In drives of low power (typically less than 100 W) the power amplification provided by firing pulse generator 64 is not necessary and the converter switching devices can be truned on and off directly by logic level signals from SAC 63.

The present invention provides a method of commutation with appropriate converter circuits for a switched reluctance drive. Not only is the mechanical output energy at a given peak current improved, but the efficency of the drive is improved by the ability to use a lower peak current which avoids saturation and resulting increased iron losses occasioned by high peak currents. The present invention also provides maximum exploitation of peak current capability of the main switching devices.

While preferred embodiments of the present invention have been shown and described herein, it will be obvious to those skilled in the art that such embodiments are provided by way of example only. Numerous variations, changes, departures, substitutions and partial and full equivalents will now occur to those skilled in the art without departing from the invention. Accordingly, it is intended that the invention be limited only by the spirit and scope of the appended claims.

What is claimed is:

1. A method for controlling the flux-linkage/current trajectory in a phase winding of a switched reluctance drive wound on two angularly-spaced stator poles, said drive including a rotor with a plurality of pairs of spaced rotor poles, each pair of rotor poles having the same angular spacing as said stator poles, said method comprising the steps of:
   (1) increasing the current in said phase winding to a predetermined value in order to build up flux in said stator poles while said stator poles and a selected pair of rotor poles are unopposed but within a predetermined distance;
   (2) short-circuiting said phase winding from approximately the time that said stator poles and said selected pair of rotor poles are first overlapped until they are nearly aligned, to provide a period of substantially constant flux linkage and decreasing phase winding current;
   (3) decreasing said current in said phase winding by freewheeling to decrease said flux linkage substantially to zero by the time that said stator poles and said selected pair of rotor poles are aligned; and
   (4) repeating steps (1)–(3) for a newly selected pair of rotor poles.

2. The method of claim 1 wherein said short circuit is removed from said phase winding between 5° and 10° of rotor rotation prior to alignment of said stator poles and said selected pair of rotor poles.

3. The method of claim 1 wherein said two angularly-spaced stator poles are diametrically opposite each other, and wherein said switched reluctance drive includes additional phase windings wound on additional pairs of diametrically opposite stator poles, the flux-linkage/current trajectory of said additional phase windings being controlled according to the method of steps (1)–(4).

4. The method of claim 1 wherein said current during freewheeling in step (3) flows from said phase winding into said dc source.

5. A method for controlling the flux-linkage/current trajectory in a phase winding of a switched reluctance drive wound on two angularly spaced stator poles, said drive including a rotor with a plurality of pairs of spaced rotor poles, said method comprising the steps of:
   (1) increasing the current in said phase winding to a predetermined value in order to build up flux in said stator poles while said stator poles and a selected pair of rotor poles are unopposed but within a predetermined distance;
   (2) removing the current from said phase winding through a nonlinear device across said phase winding to provide substantially constant voltage across said winding, beginning said removal at approximately the time that said stator poles and said selected pair of rotor poles are first overlapped, said non-linear device causing said flux to decrease substantially to zero by the time that said poles are aligned; and
   (3) repeating steps (1)–(2) for a newly selected pair of rotor poles.

6. A converter circuit for three-stage commutation of a phase of a switched reluctance drive supplied from a dc source, said phase having a bifilar winding with a primary coil and a secondary coil wound in opposite directions, said converter circuit comprising:
   a first switching element connected between the positive terminal of said dc source and a first side of said primary coil;
   a second switching element connected between the negative terminal of said dc source and a second side of said primary coil;
   a first unidirectional conduction device having its cathode connected to said first side of said primary coil and its anode connected to said negative terminal;
   a second unidirectional conduction device having its cathode connected to said positive terminal and its anode connected to a first side of said secondary coil having the opposite dot designation as said first side of said primary coil; and
   a direct connection between a second side of said secondary coil and said negative terminal;
   whereby current is supplied to said primary coil from said dc source when said first and second switching elements are conducting, said primary coil is short-circuited when said first switching element is nonconducting and said second switching element is conducting, and current is returned to said dc source from said phase through said secondary coil when both switching elements are nonconducting.

7. A converter circuit for three stage commutation of a phase of a switched reluctance drive supplied from a dc source, said phase having a bifilar winding with a primary coil and a secondary coil wound in opposite directions, said converter comprising:

a direct connection between a first side of said primary coil and the positive terminal of said dc source;

a first switching element connected between a second side of said primary coil and the negative terminal of said dc source;

a first unidirectional conduction device with its cathode connected to said first side of said pirmary coil;

a second switching element connected between the anode of said first unidirectional conduction device and said second side of said primary coil;

a direct connection between said positive terminal and a first side of said secondary coil having the opposite dot designation as said first side of said primary coil; and a second unidirectional conduction device with its cathode connected to a second side of said secondary coil and its anode connected to said negative terminal;

whereby current is supplied to said primary coil from said dc source when said first switching element is conducting and said second switching element is nonconducting, said primary coil is short-circuited when said first switching element is nonconducting and said second switching element is conducting, and current is returned to said dc source from said phase through said secondary coil when both switching elements are nonconducting.

8. A converter circuit for commutation of a phase winding of a switched reluctance drive supplied from a dc source comprising:

a direct connection between the positive terminal of said dc source and a first side of said phase winding;

a switching element connected between a second side of said phase winding and the negative terminal of said dc source;

a unidirectional conduction device with its cathode connected to said positive terminal; and a nonlinear device for maintaining a substantially constant voltage thereacross connected between the anode of said unidirectional element and said second side of said phase winding;

whereby the phase flux-linkage decays at a linear rate as current through said phase winding decreases when said switching element is switched into nonconduction.

9. A converter circuit in accordance with claim 8 wherein said nonlinear device comprises a nonlinear resistor.

10. A converter circuit in accordance with claim 8 wherein said nonlinear device comprises a zener diode having its anode connected to said cathode of said unidirectional conduction device and having its cathode connected to said second side of said phase winding.

* * * * *